(12) United States Patent
Kruglick

(10) Patent No.: US 8,904,114 B2
(45) Date of Patent: Dec. 2, 2014

(54) SHARED UPPER LEVEL CACHE ARCHITECTURE

(75) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 1077 days.

(21) Appl. No.: 12/624,833

(22) Filed: Nov. 24, 2009

(65) Prior Publication Data

US 2011/0125971 A1     May 26, 2011

(51) Int. Cl.
*G06F 12/08*     (2006.01)
*G06F 12/00*     (2006.01)

(52) U.S. Cl.
CPC .................. *G06F 12/084* (2013.01)
USPC ............ 711/130; 711/141; 711/E12.001; 711/E12.038; 711/E12.026

(58) Field of Classification Search
None
See application file for complete search history.

(56) References Cited

U.S. PATENT DOCUMENTS

| 2006/0112227 | A1* | 5/2006 | Hady et al. | 711/130 |
| 2010/0023700 | A1* | 1/2010 | Chen et al. | 711/135 |
| 2010/0138607 | A1* | 6/2010 | Hughes et al. | 711/121 |
| 2010/0153649 | A1* | 6/2010 | Li et al. | 711/130 |
| 2010/0274971 | A1* | 10/2010 | Solihin | 711/122 |

OTHER PUBLICATIONS

Blelloch, Guy E. et al, Provably good multicore cache performance for divide-and-conquer algorithms, Proceedings of the nineteenth annual ACM-SIAM symposium on Discrete algorithms, Symposium on Discrete Algorithms archive, 2008, pp. 501-510, San Francisco, California.

Kang, Dong-In, et al, Preliminary study toward intelligent run-time resource management techniques for large multi-core architectures, www.east.isi.edu/~jsuh/publ/hpec07-dkang.doc, pp. 1-2, University of Southern California—Information Sciences Institute, California.

Emma, P.G., Understanding some simple processor-performance limits, Performance analysis and its impact on design, Feb. 19, 1997, vol. 41, No. 3, obtained online via http://web.archive.org/web/20001209051500/http://www.research.ibm.com/journal/rd/413/emma.html on Jul. 1, 2013.

* cited by examiner

*Primary Examiner* — Denise Tran

(57) ABSTRACT

Various implementations of shared upper level cache architectures for multi-core processors including a first subset of processor cores and a second subset of processor cores and a module configured to copy data from a first shared upper level cache memory to a second shared upper level cache memory are generally disclosed.

21 Claims, 6 Drawing Sheets

500 A computer program product.

502 A signal bearing medium.

504 at least one of
  one or more instructions for accessing a first shared cache memory by one or more processor cores of a first plurality of processor cores;

one or more instructions for accessing a second shared cache memory by one or more processor cores of a second plurality of processor cores;

one or more instructions for accessing a third shared cache memory by one or more processor cores of a third plurality of processor cores;

one or more instructions for storing a first copy of shared data in the first shared cache memory;

one or more instructions for storing a second copy of the shared data in the second shared cache memory;

one or more instructions for accessing a first local cache memory by a first processor core of the first plurality of processor cores; or one or more instructions for accessing a second local cache memory by a second processor core of the first plurality of processor cores.

| 506 a computer-readable medium. | 508 a recordable medium. | 510 a communications medium. |

FIG. 5

SHARED UPPER LEVEL CACHE ARCHITECTURE

BACKGROUND

Multi-core processors may experience greater impact from cache misses and cache busy events. A number of factors may result in increased cache misses on multi-core processors, such as linear superscalar optimization, where instructions may be loaded for the next execution step during the previous execution step, and simultaneous multi-threading, in which processes may be swapped during execution delays. Tracking processes in multi-core processors and moving processes between cores may further impact cache capabilities. A multicore chip may have both a private per-core Level 1 (L1) cache and a chip-wide shared Level 2 (L2) cache and cache penalties may be most acute when multiple cores seek access to the L2 cache.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 5 illustrates an example computer program product; and

DETAILED DESCRIPTION

Figure 1:
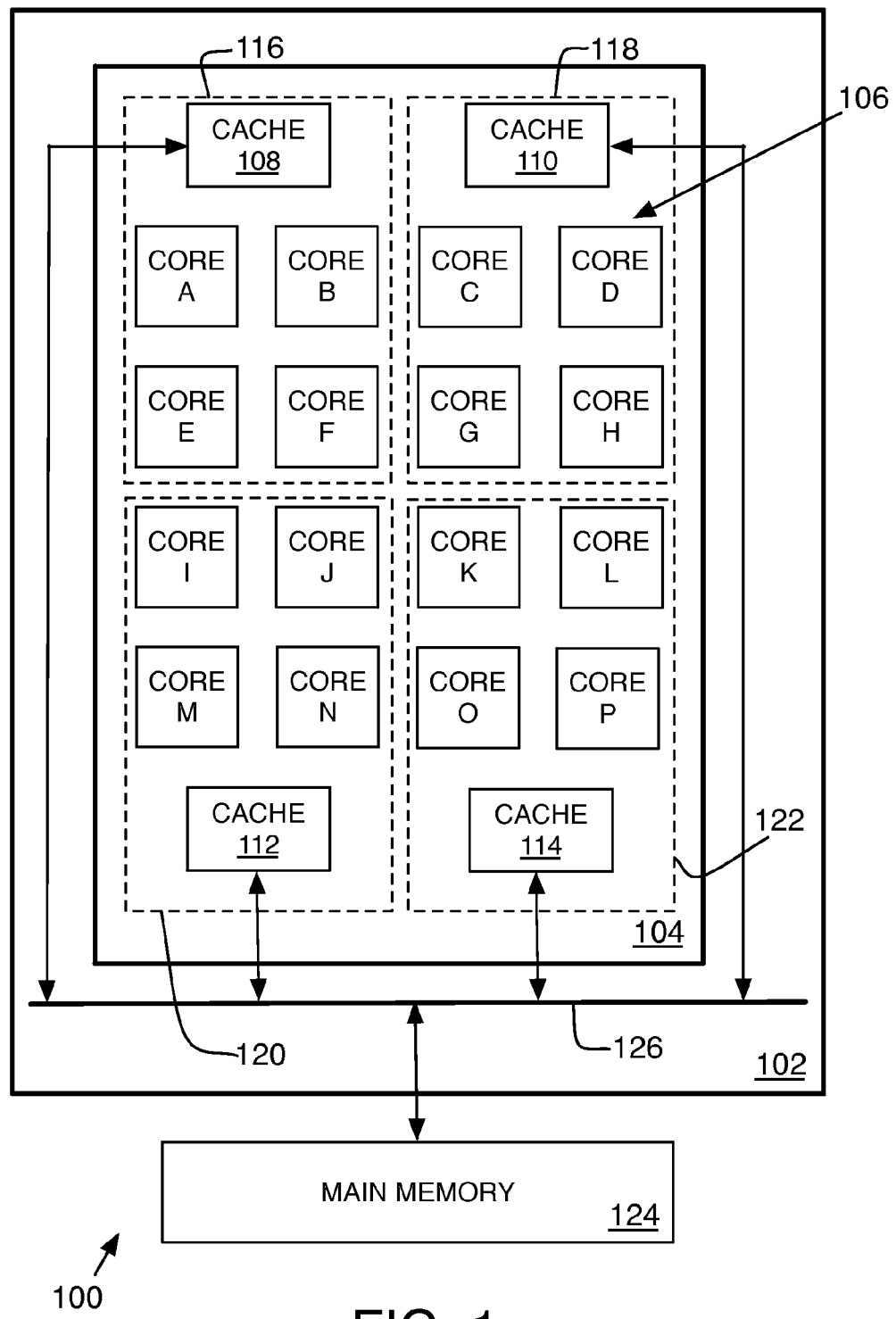
FIG. 1 illustrates an example shared upper level shared cache architecture apparatus and/or system.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to multicore processors. More specifically, implementations will be described in reference to providing shared upper level cache architectures for groups of processor cores.

In accordance with the present disclosure, distinct and/or separate higher level (or upper level) caches, such as level 2 (L2) and/or level 3 (L3) caches, may be shared by different groups of processor cores. Thus, for example, in various implementations, independent upper level caches may be associated with or shared by specific groups of processor cores within a multicore processor system. In some examples, a group of processor cores sharing an upper level cache may include processor cores that are physically proximate to each other and/or that are physically proximate to the shared cache. Further, in some examples, data shared by processor cores may be mirrored across the shared caches to provide multifold coverage of such data. In various implementations, the mirroring of shared data across the shared caches may be provided by logic implemented in hardware, software, and/or firmware and/or any combination thereof.

FIG. 1 illustrates an example upper level shared cache architecture apparatus and/or system 100 arranged in accordance with at least some examples of the present disclosure. System 100 may include any device or collection of devices capable of implementing shared cache architectures. For example, system 100 may include selected components of a computing device configured in accordance with techniques described herein.

System 100 may include a semiconductor die or chip 102 with a multi-core processor 104 formed on die 102. Multi-core processor 104 may include a plurality of processor cores 106 (in this example sixteen cores 106 labeled "A" through "P") and discrete higher level shared cache memories 108, 110, 112 and 114, such as on chip caches and/or low instruction count caches, associated with one or more of cores 106. In accordance with at least some examples of the present disclosure, multi-core processor 104 may be either homogeneous in structure or heterogeneous in structure. In some examples the shared cache memory may be Static Random Access Memory (SRAM) although claimed subject matter is not limited in this regard and shared cache memory may include other types of memory such as, for example, embedded Dynamic Random Access Memory (eDRAM), non-volatile memory, etc.

In the example of system 100, shared cache 108 may be associated with or shared by a subset or group of cores including cores A, B, E and F as indicated by dashed outline 116, shared cache 110 may be associated with or shared by a different subset or group of cores C, D, G and H as indicated by dashed outline 118, shared cache 112 may be associated with or shared by yet a different subset or group of cores I, J, M and N as indicated by dashed outline 120, and shared cache 114 may be associated with or shared by a further different subset or group of cores K, L, O and P as indicated by dashed outline 116.

While FIG. 1 illustrates an example arrangement of shared caches and associated processor cores, claimed subject matter is not limited to particular arrangements of shared caches with associated processor cores, to particular numbers of shared caches, to particular numbers of processor cores, and/or to particular numbers of processor cores within a group of processor cores associated with or sharing higher level cache memory. For instance, while FIG. 1 illustrates multi-core processor 104 as including both cores 106 and shared caches 108, 110, 112 and 114, claimed subject matter is not limited in this regard, and one or more of shared caches 108, 110, 112 and 114 may be located external to processor 104 and/or external to die 102. For example, in some implementations, one or more of shared caches 108, 110, 112 and 114 may be implemented on one or more separate semiconductor dies that may be, for example, flip-chip bonded to die 102.

In some implementations different shared cache memories may be shared by different groups of processing cores where each respective group of cores may be adjacent to or physically proximate to the particular shared cache memory. Thus, as shown in the example of system 100, cores A, B, E and F may be physically proximate to shared cache 108, cores C, D, G and H may be physically proximate to shared cache 110, cores I, J, M and N may be physically proximate to shared cache 112, and cores K, L, O and P may be physically proximate to shared cache 114. Associating a shared cache with a particular group of processors, such as associating cache 108 associated with cores A, B, E and F, may include permitting one or more of cores A, B, E and/or F to read and/or write data to one or more memory locations within cache 108. Other processing cores and/or groups of processing cores may be precluded from operation with cache 108, such as, for example, cores C, D, G and H, which may be excluded from reading and/or writing data to memory locations within cache 108 when, as in this example, cores C, D, G and H do not share cache 108.

In addition, in various implementations, each of cores 106 may be associated with a distinct independent lower level or Level 1 (L1) local cache not depicted in FIG. 1 in the interest of clarity. Further, system 100 may also include a system or main memory 124 communicatively coupled to cache memories 108, 110, 112 and 114 via communications pathways including a communications bus 126 such that cache memories 108, 110, 112 and 114 may read and/or write data to or from main memory 124. The main memory 124 may be Dynamic Random Access Memory (DRAM), although claimed subject matter is not limited in this regard and main memory may include other types of memory such as, for example, eDRAM, SRAM, non-volatile memory, etc.

Further, system 100 may include additional communications pathways, not shown in FIG. 1 in the interest of clarity, that may enable associated processing cores to read or write data to or from their respective shared cache memory. Moreover, system 100 may also include logic, not shown in FIG. 1 in the interest of clarity, which may be configured to provide the mirroring of data shared by some or all of cores 106 by, for example, providing separate copies of such shared data to memory locations in each of shared caches 108, 110, 112 and 114.

While example system 100 illustrates four groups of four cores associated with corresponding shared higher level caches (e.g., cores A, B, E and F associated with shared cache 108), claimed subject matter is not limited in this regard and, thus, any number or physical arrangement of processor cores may be associated with various shared higher level caches in accordance with claimed subject matter.

Figure 2:
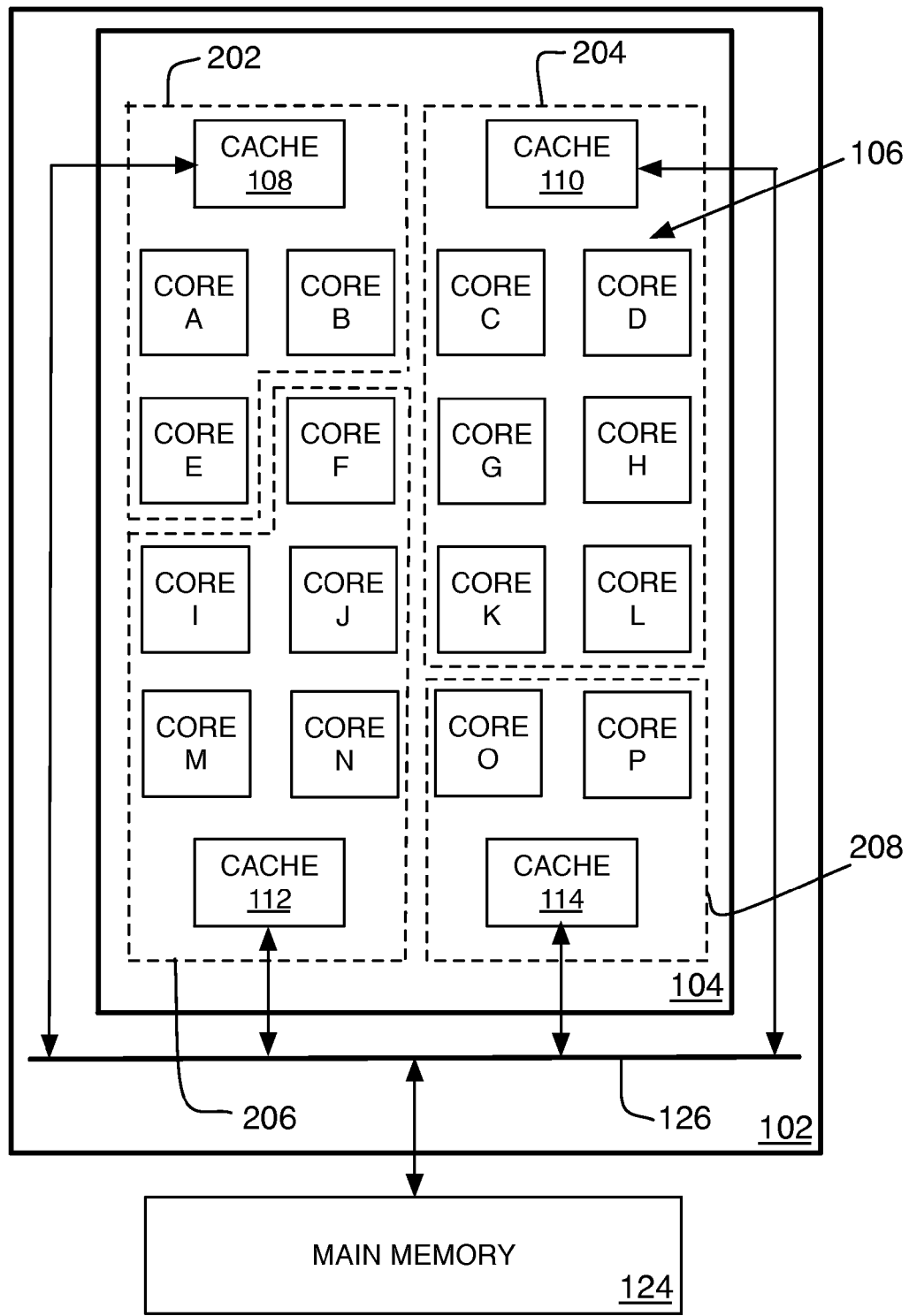
FIG. 2 illustrates another example shared upper level shared cache architecture apparatus and/or system.

FIG. 2 illustrates another shared example shared cache architecture apparatus and/or system 200 arranged in accordance with at least some examples of the present disclosure. System 200 may include any device or collection of devices capable of implementing cache architectures. For example, system 200 may include selected components of a computing device configured in accordance with techniques described herein.

Although similar to system 100, with like numbered items in system 200 representing similar components to those illustrated in system 100, example system 200 includes different groupings of processor cores than illustrated in example system 100. Thus, as shown in FIG. 2, shared cache 108 may be shared by or associated with cores A, B, E as indicated by dashed outline 202, cache 110 may be shared by or associated with cores C, D, G, H, K and L as indicated by dashed outline 204, cache 112 may be shared by or associated with cores F, I, J, M and N as indicated by dashed outline 206, and cache 114 may be shared by or associated with cores O and P as indicated by dashed outline 208. Many other groupings or arrangements of processor cores with shared cache memories may be implemented in accordance with the present disclosure.

Figure 3:
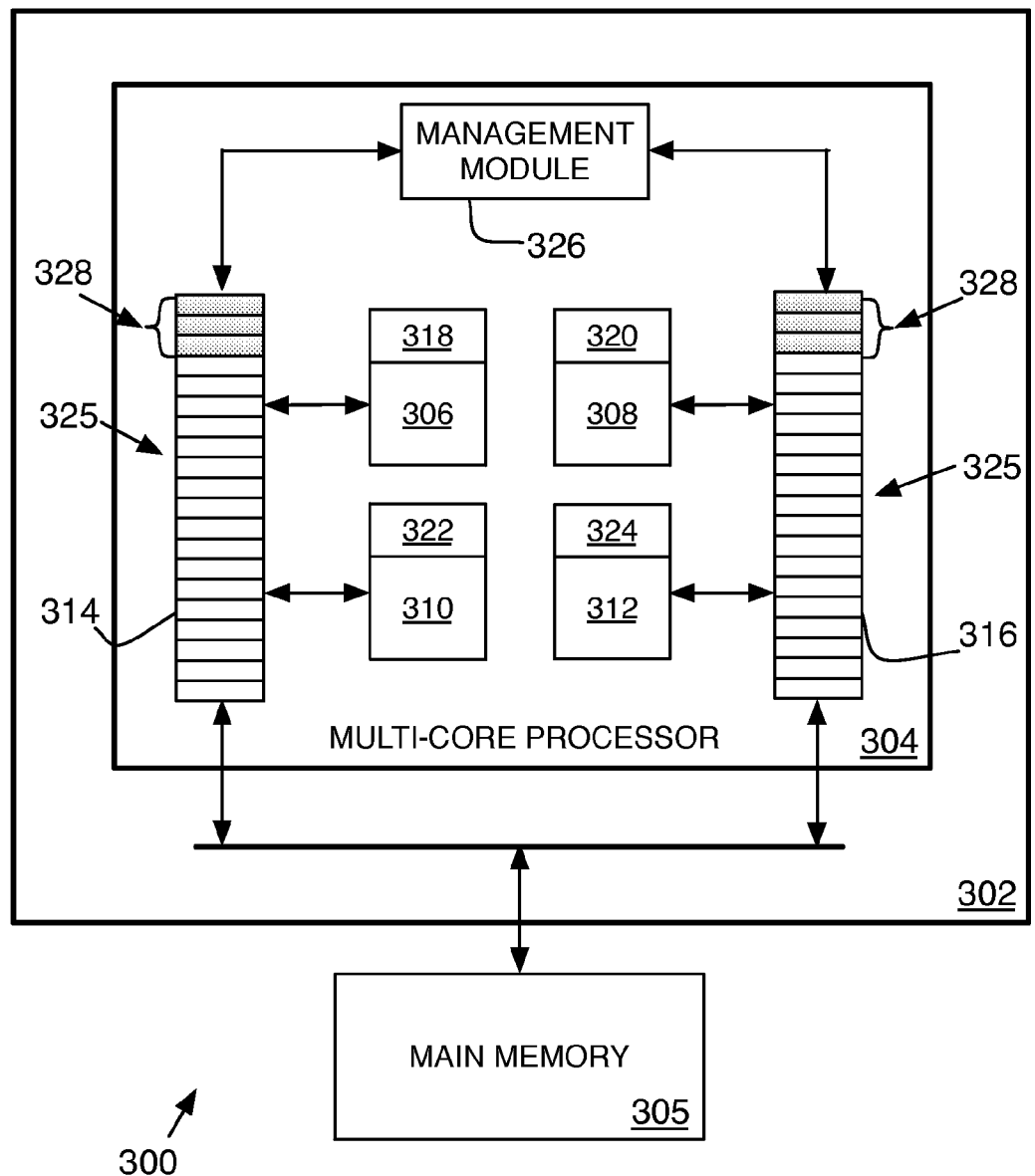
FIG. 3 illustrates yet another example shared upper level shared cache architecture apparatus and/or system.

FIG. 3 illustrates yet another example apparatus and/or system 300 arranged in accordance with at least some examples of the present disclosure. System 300 may include any device or collection of devices configured to implement the described cache architectures. For example, system 300 may include selected components of a computing device configured to operate in accordance with various techniques described herein.

System 300 may include a semiconductor die or chip 302, with a multi-core processor 304 formed on die 302, and main memory 305. Multi-core processor 304 may include four processor cores 306, 308, 310 and 312 and two higher level shared cache memories 314 and 316. In this example, processor cores 306 and 310 may share cache 314, while processor cores 308 and 312 may share cache 316. Further, each of cores 306, 308, 310 and 312 may be associated with a respective local (e.g., L1) cache memory 318, 320, 322 and 324 such that any given local cache memory, such as cache 322, may be accessed by one processor core, e.g., core 310, and not by other cores, in this example, cores 306, 308 and/or 312. In the example of FIG. 3, representative individual memory entries or segments 325 of cache memories 314 and 316 have been illustrated. The number of segments 325 illustrated in caches 314 and 316 are provided as an illustrative example and do not limit claimed subject matter to particular sizes of upper level cache memories having particular numbers of memory segments.

System 300 also includes a management module 326 configured to manage access by processor cores to shared data

328 stored or held in a subset of memory locations of both shared caches 314 and 316. Module 326 may be implemented in hardware, software, firmware or any combination thereof. Shared data 328 may be data used by cores associated with both caches 314 and 316. For example, shared data 328 may include one or more data elements or datum that may be used by any and/or all of cores 306, 308, 310 and 312, and module 326 may act to provide duplicate copies of data 328 to both caches 314 and 316. Further, module 326 may act to implement multi-fold or mirroring techniques such that module 326 may update all copies of data 328 when one or more of cores 306, 308, 310 and 312 modify the shared data by, for example, overwriting some or all of data 328.

In various examples, when a processor core, for example core 306, seeks data needed to, for example, carry out a computational instruction, core 306 may check it's private local cache 318 for the data. If the data is not stored in cache 318, then core 306 may check shared upper level cache 314 to see if the data is stored there. If the data is stored in cache 314, then core 306 may obtain the data from cache 314 for use in implementing the instruction. If, however, the data is not stored in either cache 318 or 314, then core 306 may access the data from main memory 305.

Further, in various examples in accordance with the present disclosure, when another processor core, such as core 310, that shares cache 314 with core 306, seeks data, core 310 may first check it's private local cache 322 for the data and, if core 310 does not find the data in cache 322, then core 310 may check shared upper level cache 314 to see if the data is stored there. If the data is not stored in either cache 322 or 314, then core 310 may seek the data from main memory 305. By contrast, when another processor core, such as core 312, that does not share cache 314 with core 306, seeks data, core 312 may first check it's private local cache 324, then core 312 may check separate shared cache 316 for the data rather than checking shared cache 314.

Figure 4:
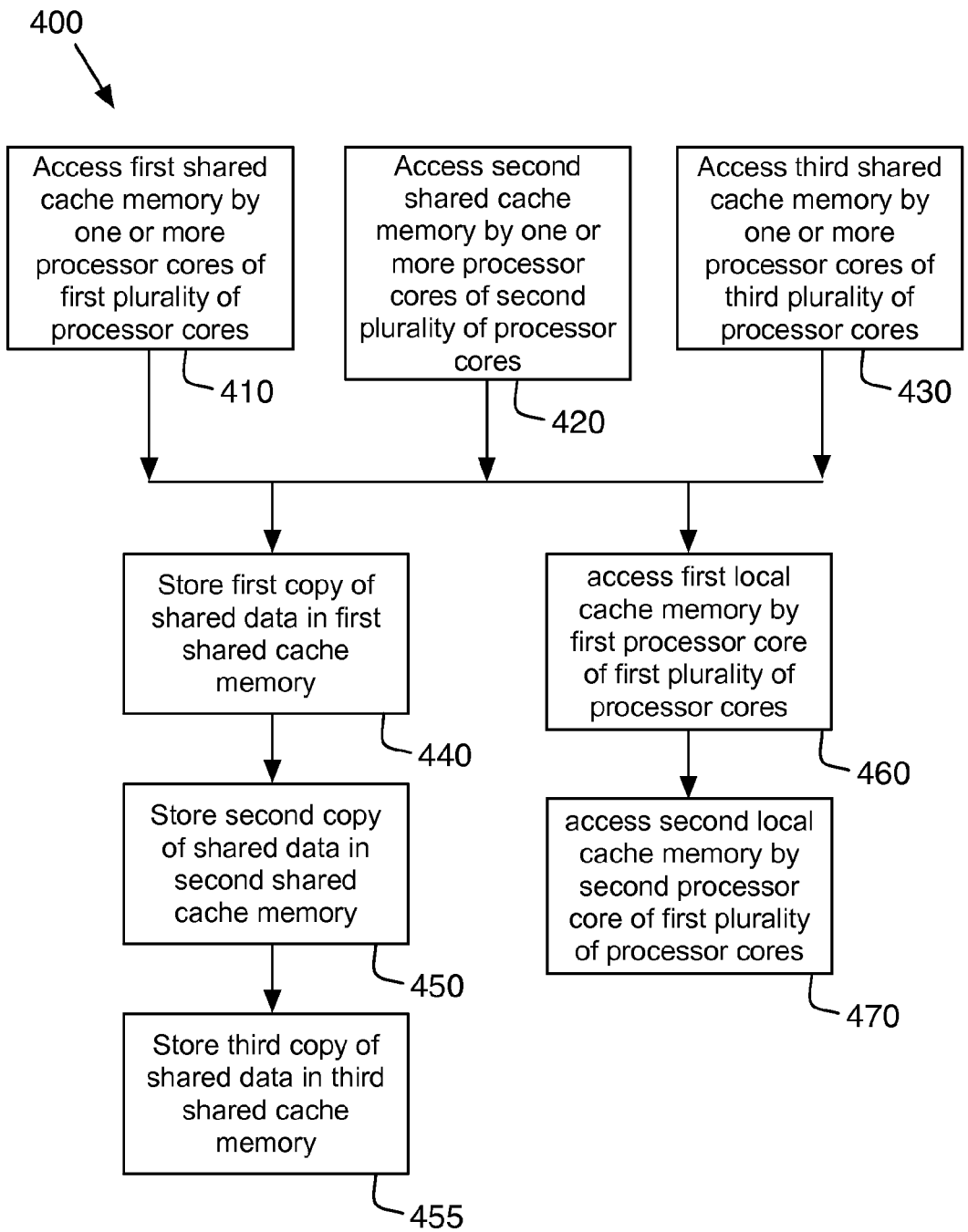
FIG. 4 is a flow chart illustrating an example process for sharing cache memory.

FIG. 4 is a flow chart of an example process 400 for sharing cache memory, arranged in accordance with at least some examples of the present disclosure. Process 400, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 4 may be practiced in accordance with claimed subject matter. Although claimed subject matter is not limited in this regard, an apparatus, such as a computer, employing a multi-core processor, may execute instructions and/or undertake actions to implement the functional blocks of process 400 as will be described in further detail below.

Process 400 may include one or more operations, functions, or actions as illustrated by block 410, 420, 430, 440, 450, 460, and/or 470. As will be evident from the description below, process 400 may begin at either block 410, 420, or 430.

In block 410, a first shared cache memory may be accessed by one or more processor cores of a first plurality of processor cores of a multi-core processor. For example, cores 306 and 310 of system 300 may access shared cache memory 314.

At block 420, a second shared cache memory may be accessed by one or more processor cores of a second plurality of processor cores of the multi-core processor. For example, cores 308 and 312 of system 300 may access a different shared cache memory, namely shared cache memory 316.

In various examples, the first group of processor cores of block 410 may include different processor cores than the second group of processor cores of block 420. In some examples, such as the example of system 300, the first and second groups may not include any processor cores in common.

Process 400 may also include, at block 430, accessing a third shared cache memory by one or more processor cores of a third plurality of processor cores of the multi-core processor. For instance, referring to the example of system 100, process 400 may include, at block 410, cores A, B, E and F accessing shared cache memory 108, at block 420, cores C, D, G and H accessing shared cache memory 110, and, at block 430, cores I, J, M and N accessing shared cache memory 112. In various examples, such as the example of system 100, the first and second groups may not include any processor cores in common and the second and third groups may not include any processor cores in common.

Process 400 may further include, at block 440, storing a first copy of shared data in a first shared cache memory, and, at block 450, storing a second copy of the shared data in a second shared cache memory. For instance, referring to the example of system 300, blocks 440 and 450 may correspond to module 326 storing multiple copies of shared data 328, one copy of shared data 328 may be stored in shared cache 314 and another copy of shared data 328 may be stored in shared cache 316. Block 440 may be followed by block 450. Further, process 400 may also include, at block 455, storing a third copy of shared data in a third shared cache memory. For instance, referring to the example of system 100, blocks 440, 450 and 455 may correspond to storing one copy of shared data in cache 108, another copy of the shared data in cache 110 and yet a third copy of the shared data in cache 112. Block 450 may be followed by block 455.

At block 460 one processor core of the first group of processor cores may access one local cache memory, while at block 470 another processor core of the first group of processor cores may access another local cache memory. For example, referring to system 300, block 460 may correspond to processor core 306 accessing local cache memory 318 while block 470 may correspond to processor core 310 accessing local cache memory 322. Block 460 may be followed by block 470.

While FIG. 4 illustrates an example ordering of the functional blocks of example process 400, claimed subject matter is not limited to any particular ordering of the various functional blocks of process 400. Thus, for example, while FIG. 4 illustrates blocks 410, 420 and 430 as occurring contemporaneously with each other, in various examples, any of blocks 410, 420 and 430 may occur before, during or after any other of blocks 410, 420 and 430. Further, for another example, while FIG. 4 illustrates blocks 460 and 470 as occurring after blocks 410, 420 and 430, in various examples, either of blocks 460 and 470 may occur before, during or after any of blocks 410, 420 and 430.

FIG. 5 illustrates an example computer program product 500 arranged in accordance with at least some examples of the present disclosure. Program product 500 may include a signal bearing medium 502. Signal bearing medium 502 may include one or more instructions 504 that, when executed by, for example, a multi-core processor, may provide the functionality described above with respect to FIGS. 1-4. Thus, for example, various components of system 300 may undertake one or more of the blocks shown in FIG. 4 in response to instructions 504 conveyed to the system 300 by medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more components of system 300 by an RF signal bearing medium 502, where the signal bearing medium 502 is conveyed by a wireless communications medium 510 (e.g., a wireless communications medium conforming with the 802.11 standard).

Figure 6:
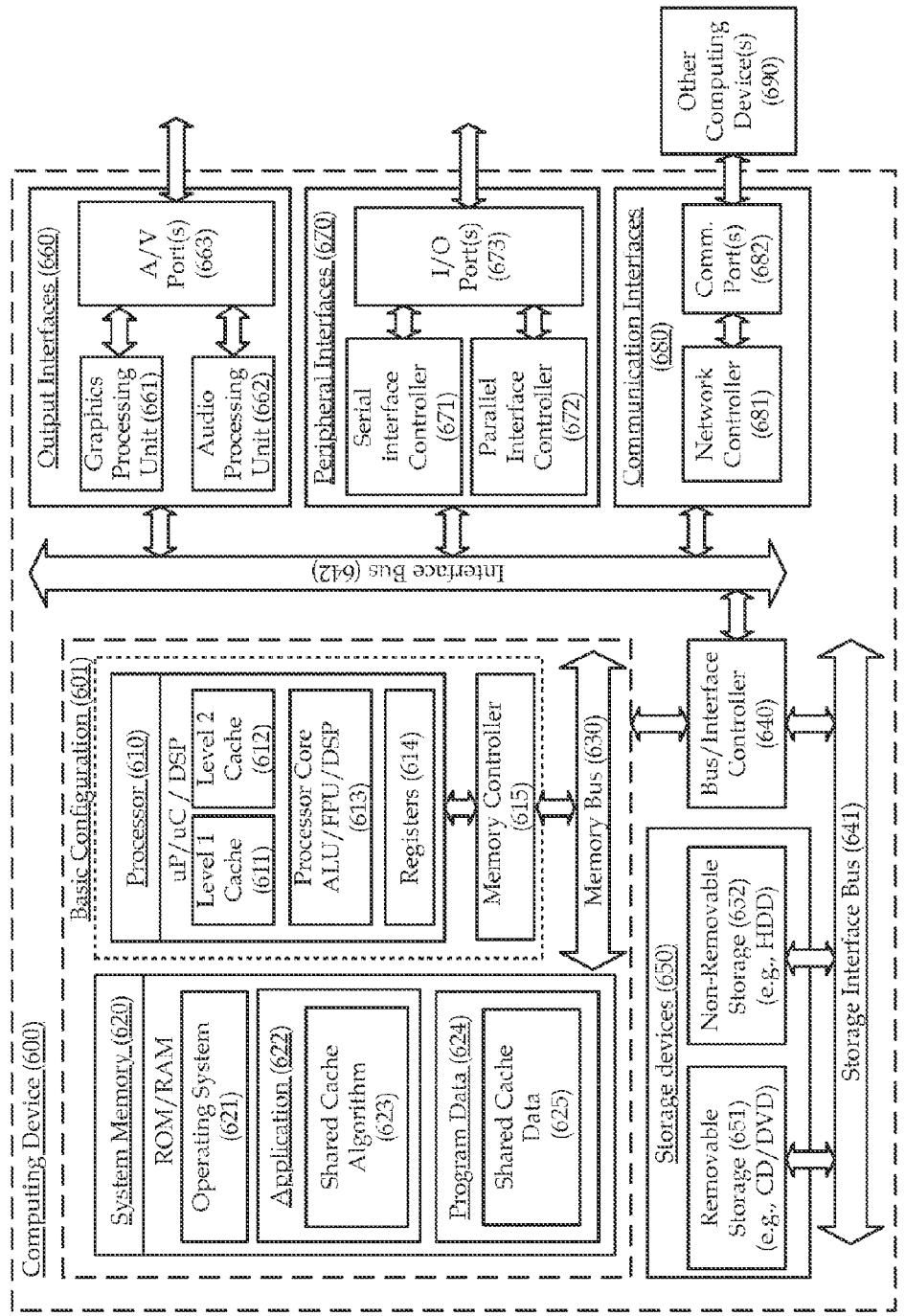
FIG. 6 is a block diagram illustrating an example computing device, all arranged in accordance with at least some embodiments of the present disclosure.

FIG. 6 is a block diagram illustrating an example computing device 600 that may be arranged for providing a shared upper level cache architecture in accordance at least some examples of the present disclosure. In a very basic configuration 601, computing device 600 may include one or more processors 610, such as one or more multi-core processors, and main or system memory 620. A memory bus 630 may be used for communicating between the processor 610 and the system memory 620.

Depending on the desired configuration, processor 610 may be of any type including but not limited to a microprocessor ($\mu P$), a microcontroller ($\mu C$), a digital signal processor (DSP), or any combination thereof. Processor 610 may include one or more levels of caching, such as a level one cache 611 and a level two cache 612, multiple processor cores 613 (only one or which is illustrated herein), and registers 614. Each processor core 613 may include an arithmetic logic unit (ALU), a floating point unit (FPU), a digital signal processing core (DSP Core), or any combination thereof. A memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include one or more of an operating system 621, one or more applications 622, and program data 624. Application 622 may include a shared cache algorithm 623 that may be arranged to perform the functions, operations, actions or processes as described herein including at least the blocks described with respect to the process of FIG. 4. Program Data 624 may include shared cache data 625 which may be useful for implementing access control algorithm 623. In some example embodiments, application 622 may be arranged to operate with program data 624 on an operating system 621 such that implementations of shared cache architectures may be provided as described herein. This described basic configuration is illustrated in FIG. 6 by those components within dashed line 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more data storage devices 650 via a storage interface bus 641. The data storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of device 600.

Computing device 600 may also include an interface bus 642 for facilitating communication from various interface devices (e.g., output interfaces, peripheral interfaces, and communication interfaces) to the basic configuration 601 via the bus/interface controller 640. Example output interfaces 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which may be arranged to facilitate communications with one or more other computing devices 690 over a network communication via one or more communication ports 682. A communication connection is one example of a communication media. Communication media may be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 600 may also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed:

1. An apparatus to implement a shared cache architecture, the apparatus comprising:
   a multi-core processor comprising a first subset of processor cores and a second subset of processor cores;
   a first shared cache memory coupled to the first subset of processor cores and configured to be accessible to the first subset of processor cores;
   a second shared cache memory coupled to the second set of processor cores and configured to be accessible to the second subset of processor cores; and
   a module coupled to the first shared cache memory and the second shared cache memory and configured to;
      access data stored in a first subset of one or more memory locations in the first shared cache memory wherein the data is to be accessed by one or more of the first subset of processor cores and one or more of the second subset of processor cores;
      mirror the data;
      store the mirrored data in a second subset of one or more memory locations in the second shared cache memory; and
      update the mirrored data responsive to modification of the mirrored data by any of the first subset of processor cores and/or the second subset of processor cores,
   wherein the first subset of processor cores includes different processor cores than the second subset of processor cores.

2. The apparatus of claim 1, wherein the multi-core processor includes a third subset of processor cores, the apparatus further comprising:
   a third shared cache memory coupled to the third subset of processor cores and configured to be accessible to the third subset of processor cores,
   wherein the third subset of processor cores includes different processor cores than the first subset of processor cores and the second subset of processor cores.

3. The apparatus of claim 1, wherein the first shared cache memory comprises cache memory adjacent to the first subset of processor cores, and
   wherein the second shared cache memory comprises cache memory adjacent to the second subset of processor cores.

4. The apparatus of claim 1, wherein the first shared cache memory comprises cache memory having closer physical proximity to the first subset of processor cores than to the second subset of processor cores.

5. The apparatus of claim 1, further comprising:
   main memory coupled to the first and second subsets of processor cores and configured to be accessible to both the first subset of processor cores and the second subset of processor cores.

6. The apparatus of claim 1, further comprising:
   a first plurality of low level cache memories, each low level cache memory of the first plurality of low level cache memories coupled to and associated with a different processor core of the first subset of processor cores.

7. The apparatus of claim 6, further comprising:
   a second plurality of low level cache memories, each low level cache memory of the second plurality of low level cache memories coupled to and associated with a different processor core of the second subset of the processor cores.

8. The apparatus of claim 1, wherein the multi-core processor, the first shared cache memory and the second shared cache memory are formed on a semiconductor die.

9. The apparatus of claim 1, wherein the first shared cache memory is further configured to not be accessible to the second subset of processor cores and the second shared cache memory is further configured to not be accessible to the first subset of processor cores.

10. A method to share cache memory by processor cores of a multi-core processor, the method comprising:
 accessing a first shared cache memory by one or more processor cores of a first plurality of processor cores;
 accessing a second shared cache memory by one or more processor cores of a second plurality of processor cores;
 accessing data from the first shared cache memory by a module;
 mirroring the data by the module;
 storing the mirrored data in the second shared cache memory by the module based at least in part in response to the data being written to the first shared cache memory by one or more processor cores of the first plurality of processor cores; and
 accessing the mirrored data by one or more processor cores of the second plurality of processor cores,
 wherein the first plurality of processor cores includes different processor cores than the second plurality of processor cores.

11. The method of claim 10, further comprising:
 accessing a third shared cache memory by one or more processor cores of a third plurality of processor cores,
 wherein the third plurality of processor cores includes different processor cores than the first plurality of processor cores and the second plurality of processor cores.

12. The method of claim 10, further comprising:
 accessing a first local cache memory by a first processor core of the first plurality of processor cores; and
 accessing a second local cache memory by a second processor core of the first plurality of processor cores.

13. A shared cache system, the system comprising:
 a multi-core processor comprising a first subset of processor cores and a second subset of processor cores;
 a first shared cache memory coupled to the first subset of processor cores and configured to be accessible to the first subset of processor cores;
 a second shared cache memory coupled to the second set of processor cores and configured to be accessible to the second subset of processor cores; and
 a module coupled to the first shared cache memory and the second shared cache memory and configured to:
  access data from the first shared cache memory;
  provide duplicate copies of the data to both the first shared cache memory and the second shared cache memory; and
  update the copied data in the first shared cache memory and the second shared cache memory responsive to modification of the data by any of the first subset of processor cores or the second subset of processor cores.

14. The system of claim 13, wherein the multi-core processor includes a third subset of processor cores, the system further comprising:
 a third shared cache memory coupled to the third subset of processor cores and configured to be accessible to the third subset of processor cores.

15. The system of claim 13, wherein the first shared cache memory comprises cache memory adjacent to the first subset of processor cores, and
 wherein the second shared cache memory comprises cache memory adjacent to the second subset of processor cores.

16. The system of claim 13, wherein the first shared cache memory comprises cache memory having closer physical proximity to the first subset of processor cores than to the second subset of processor cores.

17. The system of claim 13, wherein the multi-core processor, the plurality of local cache memories, the first shared cache memory and the second shared cache memory are formed on a semiconductor die.

18. The system of claim 13, wherein the first shared cache memory is further configured to not be accessible to the second subset of processor cores and the second shared cache memory is further configured to not be accessible to the first subset of processor cores.

19. An article, comprising:
 a non-transitory computer program product including instructions stored therein that, if executed, result in:
 accessing a first shared cache memory by one or more processor cores of a first plurality of processor cores;
 accessing a second shared cache memory by one or more processor cores of a second plurality of processor cores;
 accessing data from the first shared cache memory by a module;
 mirroring the data by the module; and
 storing the mirrored data in the second shared cache memory by the module based at least in part in response to the data being written to the first shared cache memory by the first plurality of processor cores,
 wherein the first plurality of processor cores includes different processor cores than the second plurality of processor cores.

20. The article of claim 19, wherein the non-transitory computer program product further includes instructions stored therein that, if executed, result in:
 accessing a third shared cache memory by one or more processor cores of a third plurality of processor cores,
 wherein the third plurality of processor cores includes different processor cores than the first plurality of processor cores and the second plurality of processor cores.

21. The article of claim 20, wherein the non-transitory computer program product further includes instructions stored therein that, if executed, result in storing the mirrored data in the third shared cache memory.

* * * * *

UNITED STATES PATENT AND TRADEMARK OFFICE
CERTIFICATE OF CORRECTION

PATENT NO.        : 8,904,114 B2  
APPLICATION NO.   : 12/624833  
DATED             : December 2, 2014  
INVENTOR(S)       : Kruglick Page 1 of 1

It is certified that error appears in the above-identified patent and that said Letters Patent is hereby corrected as shown below:

In the Drawings

In Fig. 6, Sheet 6 of 6, delete "uP/uC/DSP" and insert -- µP/µC/DSP --, therefor.

Signed and Sealed this
Sixteenth Day of June, 2015

Michelle K. Lee
*Director of the United States Patent and Trademark Office*